US 6,718,046 B2

(12) United States Patent
Reed et al.

(10) Patent No.: US 6,718,046 B2
(45) Date of Patent: Apr. 6, 2004

(54) LOW VISIBILITY WATERMARK USING TIME DECAY FLUORESCENCE

(75) Inventors: Alastair M. Reed, Lake Oswego, OR (US); Lou H. Berkley, Jr., San Francisco, CA (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/945,243

(22) Filed: Aug. 31, 2001

(65) Prior Publication Data

US 2002/0090112 A1 Jul. 11, 2002

Related U.S. Application Data

(63) Continuation-in-part of application No. 09/933,863, filed on Aug. 20, 2001, which is a continuation-in-part of application No. 09/898,901, filed on Jul. 2, 2001, which is a continuation-in-part of application No. 09/553,084, filed on Apr. 19, 2000, which is a continuation-in-part of application No. 09/503,881, filed on Feb. 14, 2000, which is a continuation-in-part of application No. 09/186,962, filed on Nov. 5, 1998, which is a continuation of application No. 08/649,419, filed on May 16, 1996, now Pat. No. 5,862,260, which is a continuation-in-part of application No. PCT/US96/06618, filed on May 7, 1996, and a continuation-in-part of application No. 08/637,531, filed on Apr. 25, 1996, now Pat. No. 5,822,436, and a continuation-in-part of application No. 08/534,005, filed on Sep. 25, 1995, now Pat. No. 5,832,119, and a continuation-in-part of application No. 08/436,102, filed on May 8, 1995, now Pat. No. 5,748,783.

(51) Int. Cl.[7] .................................................. G06K 9/00
(52) U.S. Cl. ...................... 382/100; 358/3.28; 380/201; 713/176
(58) Field of Search ............................... 382/100, 112, 382/135, 140, 162, 312; 347/107; 358/3.28; 380/201, 55; 713/176

(56) References Cited

U.S. PATENT DOCUMENTS

| 4,504,084 A | 3/1985 | Jauch ........................... 380/54 |
| 4,725,462 A | 2/1988 | Kimura ........................ 428/29 |
| 4,739,377 A | 4/1988 | Allen ........................... 355/133 |
| 5,051,835 A | 9/1991 | Bruehl et al. |
| 5,093,147 A | 3/1992 | Andrus et al. .................. 427/7 |

(List continued on next page.)

FOREIGN PATENT DOCUMENTS

| DE | 2943436 | 5/1981 |
| EP | 590884 | 4/1994 |

(List continued on next page.)

OTHER PUBLICATIONS

U.S. patent application Ser. No. 09/465,418, Rhoads et al., filed Dec. 16, 1999.

(List continued on next page.)

*Primary Examiner*—Jayanti K. Patel
(74) *Attorney, Agent, or Firm*—Steven W. Stewart; Digimarc Corporation (57) ABSTRACT

Media is embedded with an out-of-phase digital watermark. A first component of the digital watermark is printed using a first ultraviolet (UV) ink. The first UV ink includes a first fluorescence decay time. The second digital watermark component is inverted with respect to the first component and is printed using a second UV ink. The second ink includes a second fluorescence decay time, which is longer than the first decay time. The embedded media is illuminated with a UV pulse. The watermark is detected after the first emission decay time, but before the second emission decay time. The watermark is fragile under steady-state UV illumination since the inverted watermark component cancels the non-inverted component.

38 Claims, 5 Drawing Sheets

U.S. PATENT DOCUMENTS

| | | | |
|---|---|---|---|
| 5,291,243 A | 3/1994 | Heckman et al. ............... 399/3 |
| 5,385,371 A | 1/1995 | Izawa .......................... 283/34 |
| 5,481,377 A | 1/1996 | Udagawa et al. ........... 358/501 |
| 5,521,722 A * | 5/1996 | Colvill et al. ............... 358/500 |
| 5,530,751 A | 6/1996 | Morris |
| 5,530,759 A | 6/1996 | Braudaway et al. .......... 380/54 |
| 5,557,412 A | 9/1996 | Saito et al. |
| 5,568,555 A | 10/1996 | Shamir ........................ 380/51 |
| 5,617,119 A | 4/1997 | Briggs et al. |
| 5,636,874 A | 6/1997 | Singer .......................... 283/94 |
| 5,646,997 A | 7/1997 | Barton ....................... 713/176 |
| 5,652,626 A | 7/1997 | Kawakami et al. |
| 5,661,574 A | 8/1997 | Kawana |
| 5,687,236 A | 11/1997 | Moskowitz et al. .......... 380/28 |
| 5,689,623 A | 11/1997 | Pinard |
| 5,696,594 A | 12/1997 | Saito et al. |
| 5,721,788 A | 2/1998 | Powell et al. ................ 382/100 |
| 5,748,763 A | 5/1998 | Rhoads ....................... 382/115 |
| 5,760,386 A | 6/1998 | Ward .......................... 235/493 |
| 5,787,186 A | 7/1998 | Schroeder ................... 382/115 |
| 5,788,285 A | 8/1998 | Wicker ........................ 283/93 |
| 5,790,693 A | 8/1998 | Graves et al. .............. 382/135 |
| 5,790,703 A | 8/1998 | Wang |
| 5,809,139 A | 9/1998 | Girod et al. ................ 380/202 |
| 5,822,436 A | 10/1998 | Rhoads ........................ 380/54 |
| 5,825,892 A | 10/1998 | Braudaway et al. |
| 5,832,186 A | 11/1998 | Kawana |
| 5,862,218 A | 1/1999 | Steinberg ................... 713/176 |
| 5,862,260 A | 1/1999 | Rhoads ....................... 382/232 |
| 5,875,249 A | 2/1999 | Mintzer et al. ............... 380/54 |
| 5,893,101 A | 4/1999 | Balogh et al. .............. 707/100 |
| 5,905,800 A | 5/1999 | Moskowitz et al. .......... 380/28 |
| 5,905,819 A | 5/1999 | Daly |
| 5,915,027 A | 6/1999 | Cox et al. ..................... 380/54 |
| 5,919,730 A | 7/1999 | Gasper et al. .............. 503/201 |
| 5,930,369 A | 7/1999 | Cox et al. ..................... 380/54 |
| 5,933,798 A | 8/1999 | Linnartz ..................... 702/191 |
| 5,946,414 A | 8/1999 | Cass et al. .................. 382/183 |
| 5,951,055 A | 9/1999 | Mowry, Jr. .................. 283/93 |
| 5,960,081 A | 9/1999 | Vynne et al. ............... 713/176 |
| 5,960,103 A | 9/1999 | Graves et al. .............. 382/135 |
| 5,974,548 A | 10/1999 | Adams ....................... 713/200 |
| 5,978,013 A | 11/1999 | Jones et al. .................... 725/23 |
| 6,045,656 A | 4/2000 | Foster et al. ................ 162/140 |
| 6,046,808 A | 4/2000 | Fateley ....................... 356/330 |
| 6,054,021 A | 4/2000 | Kurrle et al. ................ 162/140 |
| 6,094,483 A | 7/2000 | Fridrich et al. ............... 380/28 |
| 6,104,812 A | 8/2000 | Koltai et al. .................. 380/51 |
| 6,115,494 A * | 9/2000 | Sonoda et al. .............. 382/165 |
| 6,122,403 A | 9/2000 | Rhoads ....................... 382/233 |
| 6,128,411 A | 10/2000 | Knox .......................... 382/232 |
| 6,136,752 A | 10/2000 | Paz-Pujalt et al. .......... 503/227 |
| 6,185,312 B1 | 2/2001 | Nakamura et al. .......... 382/100 |
| 6,185,683 B1 | 2/2001 | Ginter et al. ............... 713/176 |
| 6,192,138 B1 | 2/2001 | Yamadaji .................... 382/100 |
| 6,201,879 B1 | 3/2001 | Bender et al. .............. 382/100 |
| 6,233,347 B1 | 5/2001 | Chen et al. .................. 382/100 |
| 6,233,684 B1 | 5/2001 | Stefik et al. ................ 713/176 |
| 6,234,537 B1 | 5/2001 | Gurmann et al. ............. 283/86 |
| 6,246,777 B1 | 6/2001 | Agarwal et al. ............. 382/100 |
| 6,263,438 B1 * | 7/2001 | Walker et al. .............. 713/178 |
| 6,272,176 B1 | 8/2001 | Srinivasan .................. 375/240 |
| 6,272,248 B1 | 8/2001 | Saitoh et al. |
| 6,272,634 B1 | 8/2001 | Tewfik et al. .............. 713/176 |
| 6,281,165 B1 | 8/2001 | Cranford .................... 503/226 |
| 6,285,776 B1 | 9/2001 | Rhoads ....................... 382/100 |
| 6,304,345 B1 | 10/2001 | Patton et al. ................ 358/527 |
| 6,314,192 B1 | 11/2001 | Chen et al. .................. 382/100 |
| 6,320,675 B1 | 11/2001 | Sakaki et al. ................. 385/1.9 |
| 6,332,031 B1 | 12/2001 | Rhoads et al. .............. 382/100 |
| 6,332,194 B1 | 12/2001 | Bloom et al. ................ 713/176 |
| 6,334,187 B1 | 12/2001 | Kadono ....................... 713/176 |
| 6,356,363 B1 | 3/2002 | Cooper et al. |
| 6,373,965 B1 * | 4/2002 | Liang .......................... 382/112 |
| 6,390,362 B1 | 5/2002 | Martin ....................... 235/379 |
| 6,394,358 B1 | 5/2002 | Thaxton et al. ............. 235/494 |
| 6,404,926 B1 | 6/2002 | Miyahara et al. ........... 382/232 |
| 6,438,251 B1 | 8/2002 | Yamaguchi |
| 6,481,753 B2 | 11/2002 | Van Boom et al. ........... 283/72 |
| 2001/0014169 A1 | 8/2001 | Liang |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028727 A1 | 10/2001 | Naito et al. |
| 2001/0030759 A1 | 10/2001 | Hayashi et al. |
| 2001/0030761 A1 | 10/2001 | Ideyahma |
| 2001/0033674 A1 | 10/2001 | Chen et al. |
| 2001/0037313 A1 | 11/2001 | Lofgren et al. |
| 2001/0037455 A1 | 11/2001 | Lawandy et al. |
| 2001/0040980 A1 | 11/2001 | Yamaguchi |
| 2001/0052076 A1 | 12/2001 | Kadono |
| 2001/0053235 A1 | 12/2001 | Sato |
| 2001/0054644 A1 | 12/2001 | Liang |
| 2002/0015509 A1 | 2/2002 | Nakamura et al. |
| 2002/0018879 A1 | 2/2002 | Barnhart et al. |
| 2002/0021824 A1 | 2/2002 | Reed et al. |
| 2002/0023218 A1 | 2/2002 | Lawandy et al. |
| 2002/0027612 A1 | 3/2002 | Brill et al. |
| 2002/0027674 A1 | 3/2002 | Tokunaga et al. |
| 2002/0031241 A1 | 3/2002 | Kawaguchi et al. |
| 2002/0040433 A1 | 4/2002 | Kondo |
| 2002/0057431 A1 | 5/2002 | Fateley et al. |
| 2002/0067844 A1 | 6/2002 | Reed et al. |
| 2002/0073317 A1 | 6/2002 | Hars |
| 2002/0080396 A1 | 6/2002 | Silverbrook et al. |
| 2002/0099943 A1 | 7/2002 | Rodriguez et al. |
| 2002/0118394 A1 | 8/2002 | McKinley et al. |
| 2002/0163633 A1 | 11/2002 | Cohen |
| 2002/0176600 A1 | 11/2002 | Rhoads et al. |
| 2003/0005304 A1 | 1/2003 | Lawandy et al. |
| 2003/0012562 A1 | 1/2003 | Lawandy et al. |
| 2003/0032033 A1 | 2/2003 | Anglin et al. |
| 2003/0056104 A1 | 3/2003 | Carr et al. |

FOREIGN PATENT DOCUMENTS

| | | |
|---|---|---|
| EP | 642060 | 3/1995 |
| EP | 705022 | 4/1996 |
| EP | 991047 | 4/2000 |
| EP | 1077570 | 2/2001 |
| EP | 1137244 | 9/2001 |
| EP | 1152592 | 11/2001 |
| EP | 1173001 | 1/2002 |
| EP | 1209897 | 5/2002 |
| GB | 1534403 | 12/1978 |
| GB | 2360659 | 9/2001 |
| JP | 7093567 | 4/1995 |
| JP | 7108786 | 4/1995 |
| WO | WO95/13597 | 5/1995 |
| WO | WO96/03286 | 2/1996 |
| WO | WO01/05075 | 1/2001 |
| WO | WO01/08405 | 2/2001 |
| WO | WO01/39121 | 5/2001 |
| WO | WO01/72030 | 9/2001 |
| WO | WO01/73997 | 10/2001 |
| WO | WO01/97128 | 12/2001 |
| WO | WO01/97175 | 12/2001 |
| WO | WO02/19269 | 3/2002 |
| WO | WO02/21846 | 3/2002 |
| WO | WO02/23481 | 3/2002 |
| WO | WO01/88883 | 11/2002 |

OTHER PUBLICATIONS

U.S. patent application Ser. No. 09,619,264, Kumar, filed Jul. 19, 2000.
U.S. patent application Ser. No. 09/562,516, Rodriguez et al., filed May 1, 2000.
U.S. patent application Ser. No. 09/503,881, Rhoads et al., filed Feb. 14, 2000.
U.S. patent application Ser. No. 09/553,084, Reed et al., filed Apr. 19, 2000.
U.S. patent application Ser. No. 60/082,228, Rhoads, filed Apr. 16, 1998.
U.S. patent application Ser. No. 60/323,148, Davis et al., filed Sep. 17, 2001.
Alattar, "'Smart Images' Using Digimarc's Watermarking Technology," IS&T/SPIE's 12$^{th}$ Int. Symposium on Electronic Imaging, San Jose, CA, Jan. 25, 2000, vol. 3971, No. 25, 10 pages.
Battialo et al., "Robust Watermarking for Images Based on Color Manipulation," IH/99 LNCS 1768, pp. 302–317, 2000.
Bender et al., "Applications for Data Hiding," IBM Systems Journal, vol. 39, Nos. 3.&4, 2000, pp. 547–568.
Bors et al., "Image Watermarking Using DCT Domain Constraints," Proc. Int. Conf. on Image Processing, vol. 3, pp. 231–234.
Brownell, "Counterfeiters Dye Over Security Measures," SPIE's OE Magazine, Sep. 2001, pp. 8–9.
Fleet et al., "Embedding Invisible Information in Color Images," Proc. Int. Conf. on Image Processing, vol. 1, pp. 532–535, Oct., 1997.
Frequently Asked Questions About Digimarc Signature Technology, Aug. 1, 1995, HTTP://WWW.DIGIMARC.COM, 9 pages.
"Holographic signatures for digital images," *The Seybold Report on Desktop Publishing*, Aug. 1995, one page.

Hunt, "The Reproduction of Colour in Photography, Printing & Television," 1987, pp. 588, 589 and Plate 35 (in color).
Kohda et al., "Digital Watermarking Through CDMA Channels Using Spread Spectrum Techniques," 2000 IEEE, pp. 671–674.
Komatsu et al., "A Proposal on Digital Watermark in Document Image Communication and Its Application to Realizing a Signature," Electronics and Communications in Japan, Part 1, vol. 73, No. 5, 1990, pp. 22–33.
Komatsu et al., "Authentication System Using Concealed Image in Telematics," Memoirs of the School of Science & Engineering, Waseda Univ., No. 52, 1988, pp. 45–60.
ORuanaidh et al, "Watermarking Digital Images for Copyright Protection," http://www.kalman.mee.tcd.ie/people/jjr/eva_pap.html, Feb. 2, 1996, 8 pages.
Piva et al., "Exploiting the Cross–Correlation of RGB–Channels for Robust Watermarking of Color Images," 1999 IEEE, pp. 306–310.
U.S. patent App. Ser. No. 09/433,104 Rhoads et al., filed Nov. 28, 2002.
U.S. patent App. Ser. No. 09/694,465 Rodriguez et al., filed Oct. 23, 2000.
Kutter et al., "Digital Signature of Color Images Using Amplitude Modulation," SPIE vol. 3022, 1997, pp. 518–526.
Vidal et al., "Non–Noticeable Information Embedding in Color Images: Marking and Detection," IEEE (1999), pp. 293–297.
Wang et al., "Embedding Digital Watermarks in Halftone Screens," Security and Watermaking of Multimedia Contents II, Proc. of SPIE vol. 3971 (2000), pp. 218–227.

* cited by examiner

Time (ms)

LOW VISIBILITY WATERMARK USING TIME DECAY FLUORESCENCE

RELATED APPLICATION DATA

This application is a continuation in part of U.S. patent application Ser. No. 09/933,863, filed Aug. 20, 2001, which is a continuation in part of U.S. patent application Ser. No. 09/898,901, filed Jul. 2, 2001, which is a continuation in part of U.S. patent application Ser. No. 09/553,984. filed Apr. 19, 2000. The present application which is also cip to U.S. patent application Ser. No. 09/503,881, filed Feb. 14, 2000, which is a continuation in part of application Ser. No. 09/186,962, filed Nov. 5, 1998, which is a continuation of application Ser. No. 08/649,419, filed May 16, 1996, now U.S. Pat. No. 5,862,260; application Ser. No. 08/649,419 is a continuation in part of PCT/US96/06618, filed May 7, 1996, and U.S. application Ser. No. 08/637,531, filed Apr. 25, 1996 (now U.S. Pat. No. 5,822,436, and U.S. application No. 08/534,005, filed Sep. 25, 1995 (now U.S. Pat. No. 5,832,119), and U.S. application Ser. No. 08/436,102, filed May 8, 1995 (now U.S. Pat. No. 5,748,783).

FIELD OF THE INVENTION

The present invention relates to digital watermarks, and is particularly illustrated with reference to fragile and low-visibility watermarks.

BACKGROUND AND SUMMARY OF THE INVENTION

It's not as easy to spot a pirate as it used to be. The first time you laid eyes on Captain Hook you knew that you were dealing with a pirate. Maybe it was the black flag. Maybe it was his motley crew. Now times have changed. Today pirates wear finely tailored suits. Or they lurk in homemade manufacturing facilities in their garage. Yet a common thread binds today's pirates to their historic comrades—they seek to profit from other people's work and creativity. They remain common thieves.

Consumers increasingly face the difficult task of discerning genuine products from counterfeits and pirated copies. Pirates (including counterfeiters) annually rob industry in the order of hundreds of billions. Targeted items include banknotes, stock certificates, product tags and labels, artwork, images, music, videos, CDs, DVDs, etc., etc.

A solution is needed to effectively combat piracy and counterfeits.

Digital watermarking offers such a solution. Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

Most commonly, digital watermarking is applied to media signals such as images, audio, and video signals. However, it may also be applied to other types of media, including documents (e.g., through line, word or character shifting, through texturing, graphics, or backgrounds, etc.), software, multi-dimensional graphics models, and surface textures of objects, etc.

There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques vary the luminance or gain values in a signal to embed a message signal. The literature is full of other well-known digital watermarking techniques.

The encoding of a document can encompass artwork or printing on the document, the document's background, a laminate layer applied to the document, surface texture, etc. If a photograph or image is present, it too can be encoded.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Previously mentioned U.S. patent application Ser. No. 09/503,881, filed Feb. 14, 2000, discloses various encoding and decoding techniques. U.S. Pat. Nos. 5,862,260 and 6,122,403 disclose still others.

One form of digital watermarks is a so-called "fragile" watermark. A fragile watermark is designed to be lost, or to degrade predictably, when the data set into which it is embedded is processed in some manner, such as signal processing, compression scanning/printing, etc. A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations. (Fragile watermark technology and various applications of such are even further disclosed, e.g., in assignee's U.S. patent application Ser. Nos. 09/234,780, 09/433,104, 09/498,223, 60/198,138, 09/562,516, 09/567,405, 09/625,577, 09/645,779, and 60/232,163.).

Digital watermarking applications are not limited to counterfeit deterrence. Digital watermarking techniques are used in countless areas such as inventory management, content marking, serialization, indexing, internet navigation, tracking, linking, etc. Of course there are many other suitable applications.

The present invention provides an out-of-phase digital watermark. The out-of-phase watermark includes at least a first component and a second component. The second component is embedded so as to be out-of-phase with respect to the first component. In one embodiment, the first component is printed with a first ultraviolet (UV) ink and the second component is printed with a second UV ink. The first UV ink preferably has a shorter decay time in comparison to the second UV ink. The out-of-phase watermark has low visibility properties since, under steady-state UV illumination, the illuminating properties of the first and second watermark components cancel each other out. Other embodiments involve unique detection methods for a UV out-of-phase digital watermark.

The foregoing and other features and advantages of the present invention will be more readily apparent from the following detailed description, which proceeds with reference to the accompanying drawings.

DETAILED DESCRIPTION

Introduction

Inks and dyes have recently emerged with unique fluorescent properties. Some of these properties allow for variable fluorescence (or emission) decay times. Typical decay times can be varied from less than a microsecond to tens of milliseconds and more. A CCD scanner and microprocessor can measure the decay emissions from the inks and dyes. Other filtered optical capture devices (cameras, digital cameras, web cameras, etc.) can be suitably interchanged with the CCD scanner. These inks and dyes (both hereafter referred to as "ink") also include unique emission characteristics, such as emitting in a particular frequency band, which allows for frequency-based detection. Other unique characteristics include varying the frequency of light needed to activate the ink and the color of the ink's fluorescence. These characteristics can be variously combined to produce customized ink. These types of ink are typically excited with UV light and emit from ultraviolet (UV) to infrared (IR) wavelengths. To simplify the discussion, the term "UV" will be used to refer to ink that absorbs in the UV and emits in the UV and/or IR wavelengths. These inks are generally invisible when illuminated in the visible spectrum. Such inks are available from PhotoSecure in Boston, Mass., USA, such as those sold under the trade name of Smart-DYE™. See SPIE's September 2001 OE Magazine, pages 8–9 written by M. Brownell ("Counterfeiters Dye Over Security Measures"), for a further discussion of such inks. Of course other manufacturer's inks that have variable emission decay times can be suitably interchanged.

Out-of-Phase Digital Watermark

Figure 1:
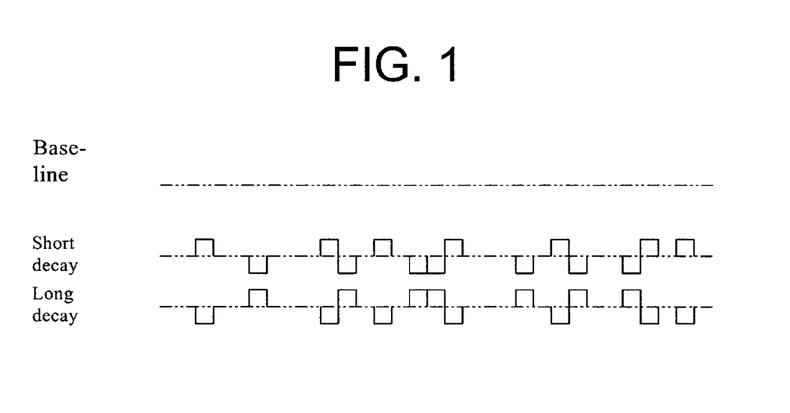
FIG. 1 is diagram showing a baseline signal, the baseline signal embedded with a digital watermark signal, and the baseline signal embedded with an inverted digital watermark signal.
Figure 2A:
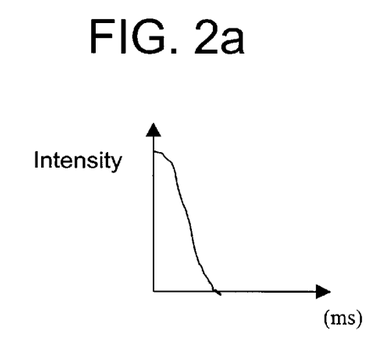
FIG. 2a is a graph showing a signal with a relatively short fluorescence decay time.

The present invention utilizes UV inks having different, yet generally predictable fluorescence decay times. The inventive digital watermark preferably includes at least two components (or signals) each of which is embedded with a UV ink that has a different fluorescence decay time. Consider a baseline signal illustrated in FIG. 1. The baseline signal represents white paper, a flat signal or an image signal that includes various color or grayscale components. (For simplicity an image signal can be illustrated as a flat signal.). FIG. 1 also illustrates the baseline signal including a first digital watermark signal ("short decay") embedded therein. The illustrated "bumps" in FIG. 1 represent the watermark signal, e.g., upward or downward signal adjustments in relation to the respective baseline signal. If the baseline signal is paper, the short decay watermark signal can be applied (e.g., printed) to the paper. The short decay watermark signal is preferably printed with ink having a relatively short fluorescence decay curve as shown in FIG. 2a. The decay time extinction shown in FIG. 2a preferably ranges from less than 1 millisecond (ms) to about 10 ms. Of course this range can be expanded according to need.

Figure 2B:
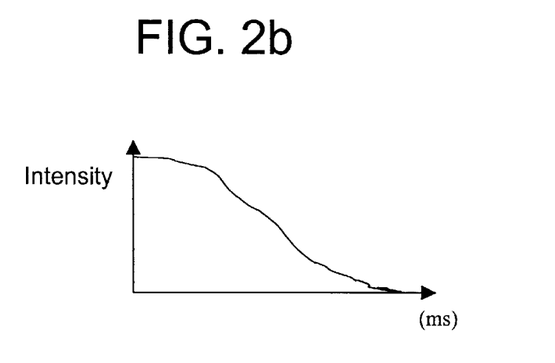
FIG. 2b is a graph showing a signal with a relatively longer fluorescence decay time.

FIG. 1 also illustrates the baseline signal embedded with a second digital watermark signal ("long decay"). The long decay watermark signal is preferably embedded to be out-of-phase with respect to the short decay watermark signal. Most preferably, the long decay signal is approximately 180 degrees out-of-phase (e.g., is inverted) with respect to the short decay signal. (See Assignee's U.S. patent application Ser. Nos. 09/898,901 and 09/933,863 for a further discussion of out-of-phase digital watermarks.). If the baseline signal is white paper, the long decay watermark signal can be applied (e.g., printed) on the white paper. The long decay watermark signal is preferably printed (e.g., applied) with ink having a relatively longer fluorescence decay curve as shown in FIG. 2b. The decay extinction time shown in FIG. 2b preferably ranges from several milliseconds (ms) to about 100 ms. Of course this range can be extended according to system need.

The short decay and long decay signals are preferably printed or otherwise applied to paper (or other surfaces). These collective signals form an "out-of-phase" digital watermark. Such a digital watermark has unique and desirable properties. A first property is that the digital watermark is preferably invisible when illuminated in the visible spectrum, since it is applied with the UV inks discussed above. A second property is that the digital watermark signal is imperceptible with steady state (e.g., constant) UV illumination. Imperceptibility is caused by local area cancellation of the first and second digital watermark signals. Indeed, since the second digital watermark signal (long decay signal) is inverted with respect to the first digital watermark signal (short decay signal), the two signals effectively cancel each other out under constant UV illumination. The perceptible result under steady-state illumination is the flat signal (e.g., the baseline signal). Another desirable quality is that UV inks prevent almost all other successful counterfeit attempts, since the specific UV and delay properties are extremely difficult to replicate, particularly for a casual counterfeiter.

Parent application Ser. No. 09/933,863 discloses a fragile watermarking technique that is particularly well suited for color imaging applications. A watermark signal in one color plane (or channel) is applied to be out-of-phase with corresponding watermark signals in other color planes (or channels). An effect of the inventive out-of-phase watermarking technique is to greatly reduce watermark visibility by canceling perceived luminance change in local areas throughout the image. The disclosed watermark is also fragile, since signal-processing operations tat combine the out-of-phase color channel with the other channels cancels the watermark signal. The watermark can be detected using infrared detection methods described herein.

Using CMYK media as one example, parent application Ser. No. 09/933,863 discloses that such an inventive watermarking scheme greatly reduces watermark visibility. Since the watermark signal for the K channel is applied approximately 180 degrees out-of-phase, when compared to the respective changes applied to the CMY channels, the watermark visibility is greatly reduced. The visibility reduction is produced by the effective cancellation of perceived luminance changes when the CMYK image is viewed or printed. Indeed, combining an inverted watermark signal "tweak" or "bump" in a K channel, with a corresponding non-inverted watermark signal tweak or bump in the CMY channels effectively cancels an overall perceived luminance change— effectively reducing visibility of the digital watermark.

Out-of-Phase Digital Watermark Detection

Figure 3:
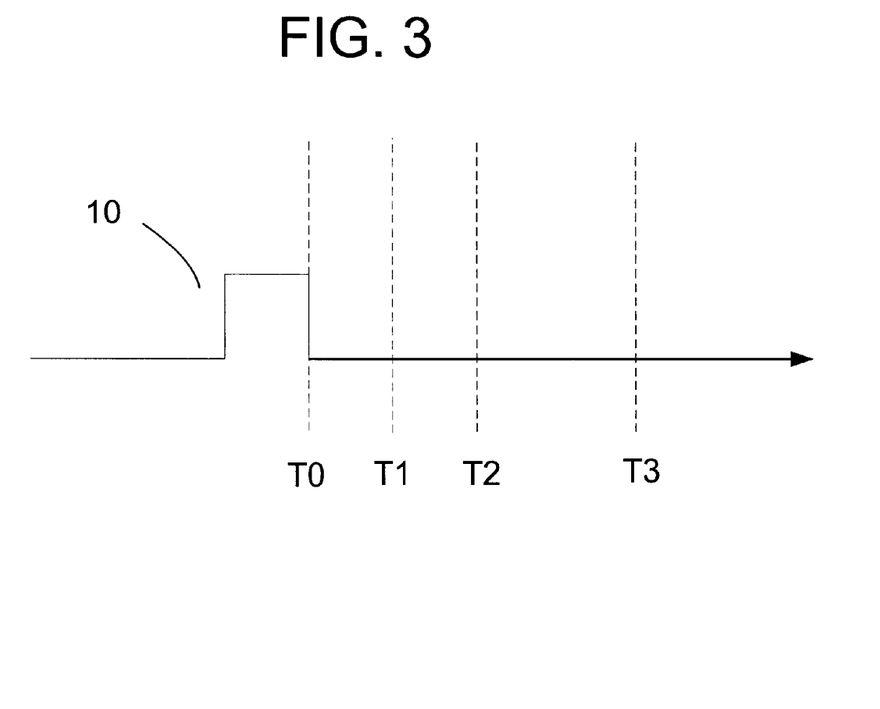
FIG. 3 illustrates relative timing for a UV pulse.

Exciting the digitally watermarked ink with UV illumination facilitates detection. Preferably, a pulse 10 of UV wavelength light as shown in FIG. 3 stimulates the digitally watermarked UV ink. The UV inks begin their emission decay at T0 or near to the falling edge of the UV pulse. The first watermark signal's (short decay) fluorescence emissions decay in a relatively short time (T1) as shown by the dotted curve in FIG. 4. The second watermark signal's (long decay) fluorescence emissions decay in a relatively longer time (T3) as shown by the solid curve in FIG. 4. The digital watermark is detectable from the longer decaying ink after emissions from the first ink decay (T1), but before emissions from the second ink decay (T3). The signal is detectable in this T1–T3 range since it is free from the canceling effects of the short decay ink. Of course, the second watermark signal maybe more readily detected in a range of T1–T2, due to emission strength in this range. In alternative cases, the T1 and T3 points mark predetermined decay levels, instead of emission extinction points. For example, at T1 the short decay ink may have decayed to a predetermined level. This level may be determined based on acceptable interference levels with respect to the longer decay ink, or vice versa.

Figure 4:
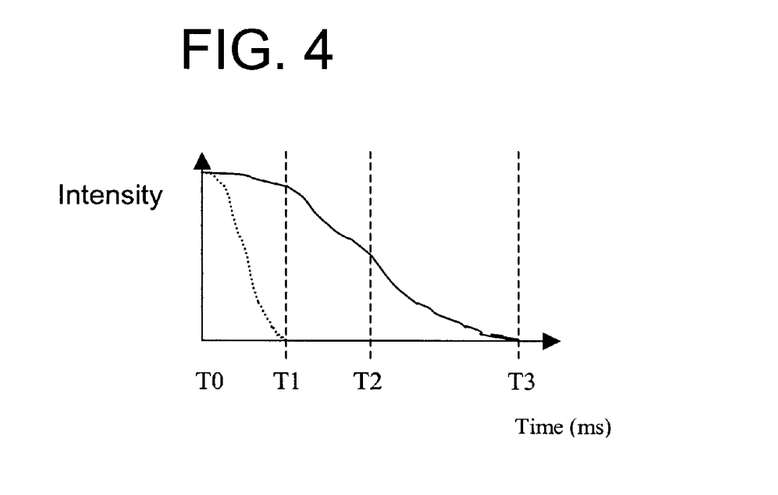
FIG. 4 is a graph showing relative decay times and camera gating timing in relation to the signals shown in FIGS. 2a, 2b and 3.

A camera (or CCD sensor) can be gated or enabled (e.g., operating during the T1–T2 time range shown by the dashed lines in FIG. 4) to capture emissions after the short decay time ink decays (T1), but while the long decay time ink is still emitting (until T3). (Alternatively, the camera can continuously capture UV emissions until a watermark signal is detected.). The digital watermark can be detected and decoded from this captured image. Of course, a gated range can be varied according to ink delay times and may even be varied as part of a security measure. For example, inks decay time (or the relative decay window between the first and second ink) can be maintained in secrecy or can be randomly varied. The particular gating window is then supplied to a camera for detection calibration. Alternatively, a separate robust watermark may carry encoded (or encrypted) information that suggests the decay windows. Or another identifier may be used to access the particular decay time information.

Embedding the Out-of-Phase Watermark with Separate Plates

In one embodiment, the short and long decay time inks are printed by separate printing plates, which are overprinted on top of a conventionally printed image (or blank paper or documents). For example, the short decay ink is separately overprinted on the image with a first plate, and then the image is overprinted with a second plate carrying the long decay time ink. As discussed above the short and long decay time inks are generally invisible when illuminated in the visible spectrum, so such overprinting is typically imperceptible in the visible spectrum. Some printing processes involve printing a laminate or overlay. The first and second plates can be used in this (or after) laminate or overlay process.

The overprinted inks can be detected as discussed above with respect to FIG. 4.

Embedding the Out-of-Phase Watermark with CMYK

Images that are stored in CMYK format, have built in redundancy since many different combinations of CMYK can be used to represent the same color. Advantage can be taken of this redundancy in a watermarking process to reduce the visibility of the watermark. (See Assignee's U.S. patent application Ser. Nos. 09/898,901 and 09/933,863 for a further discussion of CMYK's redundant properties.).

Figure 5:
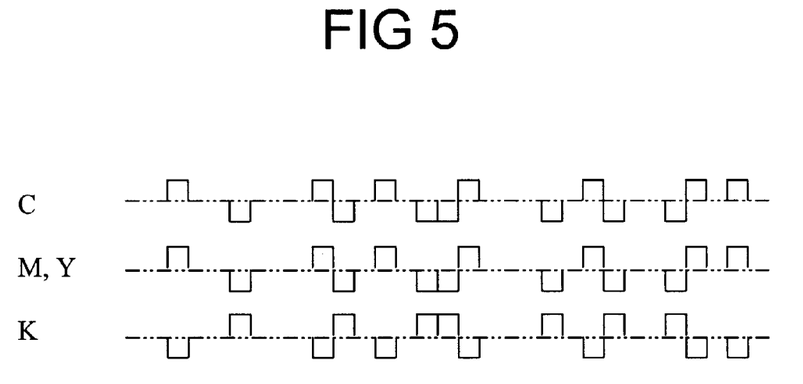
FIG. 5 is a diagram illustrating color data embedded with an out-of-phase digital watermark.

Now consider FIG. 5, where the dash/dot C, M, Y and K lines represent respective cyan, magenta, yellow and black color dimensions for a line in a color patch of a media signal (e.g., a line in a picture, image, document, etc.). The various color lines are embedded with a watermark signal. The watermark signal is preferably applied to each of the color component dimensions (C, M and Y). The M and Y channels are represented by one signal in FIG. 5, since these color components can be approximately equal, but separate signals for various graylevels. Of course, it is not necessary for these components to be equal, and in many cases the yellow and magenta components are not equal. The illustrated embedded "bumps" represent the watermark signal, e.g., upward or downward signal adjustments in relation to the respective color channel at given points over the baseline (color) signal. For the K dimension (or channel), the watermark signal is preferably embedded to be out-of-phase with the CMY channels. Most preferably, the K channel is approximately 180 degrees out-of-phase (e.g., inverted) with the watermark signals in the CMY color channels, as shown in FIG. 5. Collectively these color channels are referred to as a CMYK out-of-phase digital watermark.

Preferably, a long decay time UV ink (FIG. 2b) is combined with the K channel ink. Similarly, a short decay time UV ink (FIG. 2a) is combined with the CMY channel inks. As discussed, the UV inks are generally imperceptible when illuminated in the visible spectrum, yet emit detectable UV and/or IR emissions when excited by a UV light source (e.g., UV Diode, Laser UV diode, UV illumination source, etc.).

The watermark tweak for the K channel (including a first UV ink) is applied out-of-phase in comparison to the changes applied to the CMY channels (including a second UV ink). Thus the watermark visibility is greatly reduced. The low visibility properties result by the effective cancellation of the non-inverted signal by the inverted signal. The low visibility properties hold for situations involving steady-state UV illumination as discussed above for the FIG. 1 out-of-phase watermark.

The out-of-phase digital watermark can be detected by illuminating the printed image with a pulse of UV light. A camera is gated to capture the image after emissions from the short decay time ink are extinguished, but while the long decay time ink is still emitting. Alternatively, a camera continuously (or periodically) captures image data until a watermark detection process finds a watermark signal (e.g., such as after T1 in FIG. 4). The captured image is passed into a watermark detection process to detect the watermark signal.

Figure 6A:
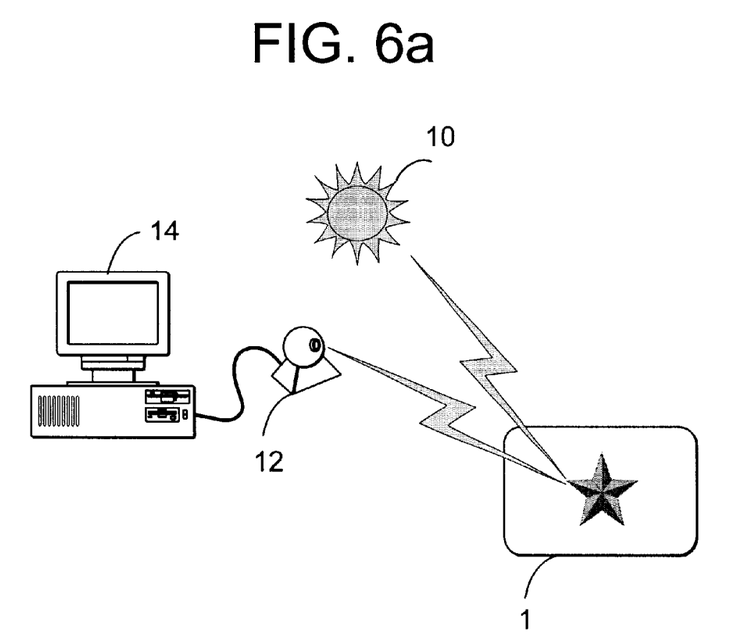
FIGS. 6a and 6b respectively illustrate image capture of an out-of-phase digital watermark and camera synchronization.

With reference to FIG. 6a, media 1 includes an out-of-phase digital watermark applied with UV inks. The out-of-phase watermark can be a CMYK watermark or a two-channel watermark shown with reference to FIG. 1. Media 1 is excited by a UV illumination source 10. Media 1 can include documents, tags or labels, certificates, graphics, plastics, fabrics, metals, films, polymers, artwork, images, photographs, etc., etc. UV illumination source 10 preferably emits a UV pulse such as shown in FIG. 3. The UV pulse excites the UV inks on media 1. The UV inks emit fluorescence emissions that begin to decay on (or near) the falling edge of the UV pulse. Camera 12 captures an image of the UV emissions. Camera 12 can be gated to capture an image after the decay of a shorter decay time ink, but before the decay of a longer decay time ink. The captured image is communicated to computer 14. Of course, camera 12 can communicate with computer 14 via a wireless, tethered link or other communications channel. Preferably, computer 14 includes executable software instructions to detect and decode the digital watermark signal embedded within media 1. The software instructions can be stored in memory or electronic memory circuits. Of course, computer 14 can be a handheld computer, a laptop, a general-purpose computer, a workstation, etc. Alternatively, computer 14 includes a hard-wired implementation, which precludes the need for software instructions.

Figure 6B:
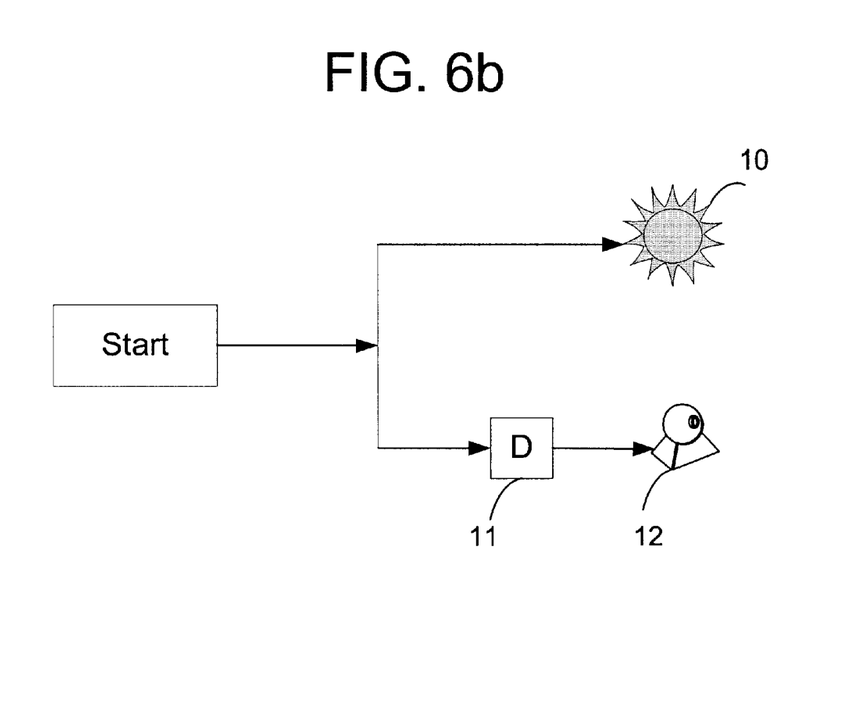

In one embodiment (FIG. 6b), a start signal is communicated to illumination source 10 and camera 12. The start signal enables illumination source 10 and camera 12. The start signal is preferably communicated through delay 11 to help synchronize camera 12's gating, e.g., to enable camera 12 at or near the T1 point (see FIG. 4). Camera 12 can include internal timing source or signal (or can communicate with an external timing source or signal) to disable camera at the T2 point or beyond. Alternatively, camera 12 is disabled upon watermark detection. In an alternative embodiment, the start signal is communicated from illumination source 10 to camera 12. Delay 11 can be arranged internally in either illumination source 10 or camera 12, or can arranged external to these devices. Of course, other suitable synchronization techniques can be suitably interchanged with the present invention to facilitate gating of camera 12.

Additional Detection Methods

Figure 7:
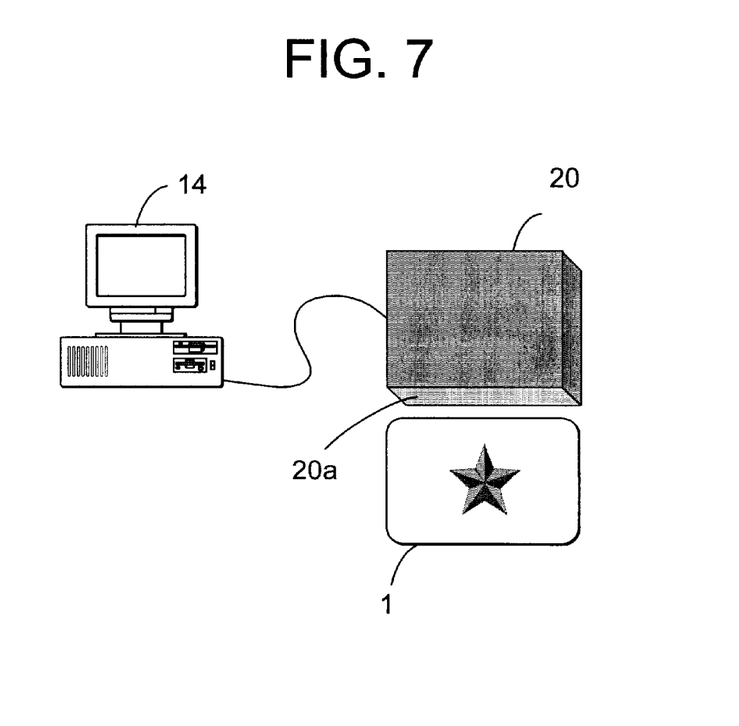
FIG. 7 illustrates an ultraviolet detection apparatus.

With reference to FIG. 7, a detection housing 20 houses a UV illumination source 10 and camera 12 (not shown in FIG. 7, since they are within the opaque housing 20). Camera 12 can be a CCD sensor, a CMOS detector, digital camera, web camera, etc. The housing 20 is preferably opaque to shield (or otherwise constructed to filter) the camera 12 and media 1 from visible, UV and/or IR light. The housing 20 has an opening 20a to receive the media 1. In a first case, opening 20a is adapted to engulf media 1. This allows media 1 to be placed on a surface (e.g., table, imaging station, or counter) and the housing opening 20a to be placed over media 1, effectively shielding media 1 from visible, UV and/or IR light. In a second case, the opening 20a receives media 1 into (e.g., slides media through opening 20a) and positions media 1 within the opaque housing 20. In either case, the UV illumination source 10 illuminates media 1, and the digital camera 12 captures an image of the illuminated media (or the emissions from the UV inks used to print media 1). The digital camera 12 communicates with computing device 14, which detects and decodes a digital watermark embedded with media 1.

In another illustrative embodiment, the above described UV detection technique is carried out in a visibly dark environment, such as a dark room, shielded area, etc. An out-of-phase digital watermark is embedded in media. The media is illuminated with a UV illumination source, and a digital camera captures an image of (or emissions from) the illuminated media. The digital camera communicates with a computing device, which detects and decodes an out-of-phase digital watermark embedded in the media.

In still another embodiment, a UV out-of-phase digital watermark is excited by UV light in a visibly lighted environment. The CCD sensor (or other camera) includes filters to pass UV emissions while blocking the reflected IR (or visible) light.

Now consider an embodiment described with reference to FIGS. 8 and 9. A UV pulse 10 excites the inks shown in FIGS. 2a and 2b. At a time T0 the inks begin to decay. At time T1 the short decay ink (illustrated with a dotted line) is exhausted or falls below a predetermined level. A camera detects the inverted watermark signal from the long decay ink in the time range of T1–T2. At a time T2 the UV signal (pulse) transitions high 10a. The short and long decay inks are excited and emit at the S+L level shown in FIG. 9. The watermark signal is effectively masked after the T2 point due to the go cancellation of the non-inverted watermark signal by the inverted watermark signal.

Figure 8:
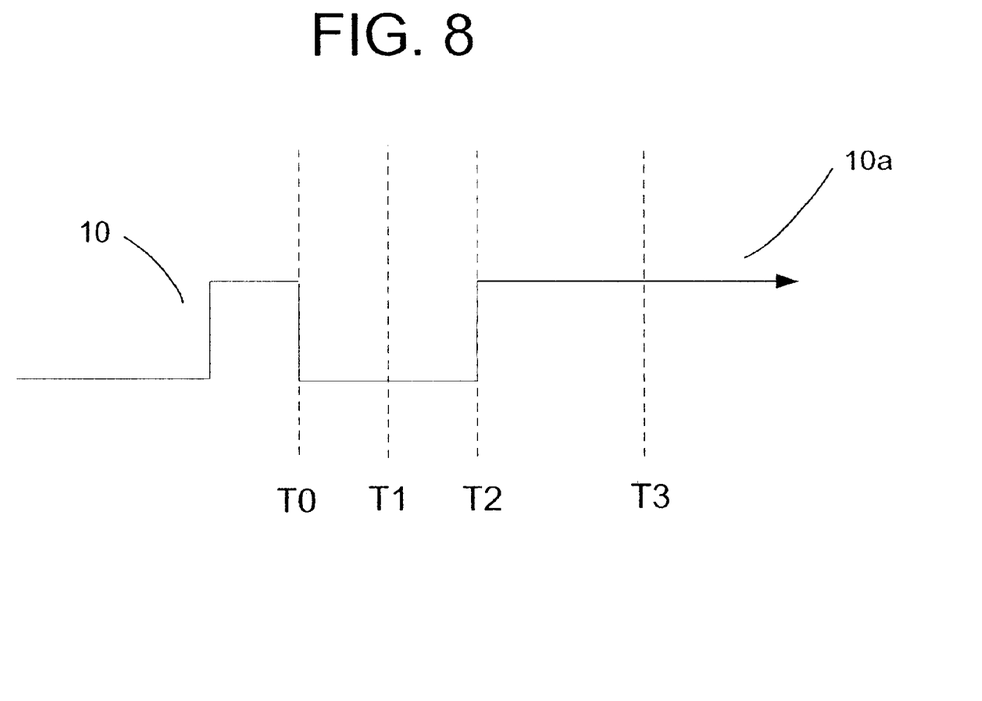
FIG. 8 illustrates relative timing for a series of UV pulses.
Figure 9:
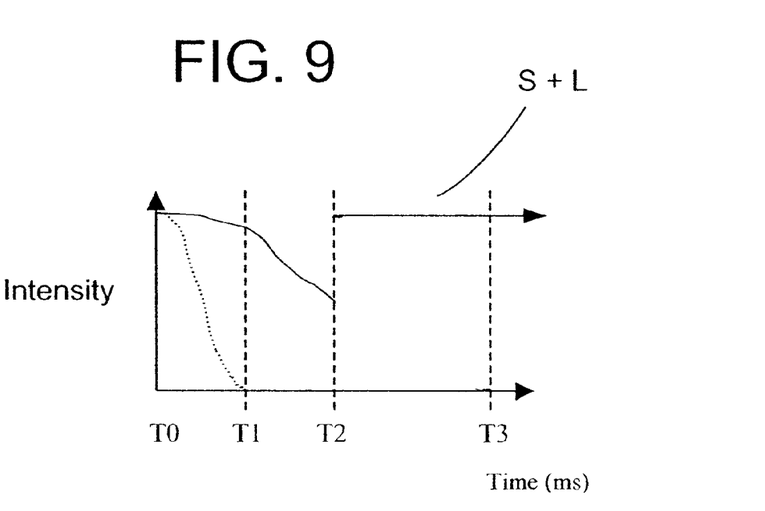
FIG. 9 is a graph showing relative decay times and camera gating timing in relation to the signals shown in FIGS. 2a, 2b and 8.

Detection of the watermark signal is effectively limited to the T1–T2 window in a multiple UV pulse system as shown in FIGS. 8 and 9. Of course the 10a pulse can remain high or can include a series of UV pulses, which may allow for multiple capture windows. The T1–T2 time window can be optionally varied (time-shifted and/or shortened/lengthened) to improve visibility effects and to even further reduce detectability.

Fragile Watermark

A UV out-of-phase watermark is fragile since an operation (including UV steady-state illumination) that combines the K channel with the CMY channel effectively cancels the watermark signal.

A fragile watermark has utility in many applications. Take counterfeit and piracy deterrence, for example. The inventive UV watermark is embedded in original CMYK media. If the media is copied, the embedded fragile watermark is either lost or degrades predictably, e.g., in part due to the decay-time characteristics of the UV inks. The copy is recognized as a copy (or counterfeit) by the absence or degradation of the watermark. Particular camera gating settings also can be established to further frustrate would-be counterfeiters. UV out-of-phase watermarks can also be used in conjunction with other watermarks, such as robust watermarks. The UV watermark announces a copy or counterfeit by its absence or degradation, while the other robust watermark identifies author, source, links and/or conveys metadata or other information, etc. In other embodiments, a UV out-of-phase watermark is an enabler. For example, some UV out-of-phase watermarks may include plural-bit data that is used to enable a machine, allow access to a secure computer area, verify authenticity, internet navigation and/or link to information. This plural-bit data is lost or sufficiently degrades in a copy, preventing the enabling functions. Other fragile watermark applications are discussed in the U.S. patent in applications incorporated above.

Alternative Embodiments

Fluorescent inks are available which fluoresce a visible color emission when exposed to an ultra violet (UV) light source (e.g., a black UV light source). Many of these inks are invisible when illuminated (or excited) in the visible spectrum. These inks are ideally suited for covert applications such as copy control or counterfeit detection, since they are generally imperceptible when illuminated in the visible spectrum. Such inks are available from Cans Ink and Supply Company in Los Angeles, Calif., USA.

Fluorescent inks (which fluoresce a visible color) can be used to print out-of-phase watermarks, particularly when they have variable emission decay times. In this case, the UV light source illuminates media. The media is printed with at least a first UV ink and a second UV ink. The first UV ink includes a relatively shorter decay time in comparison to the second UV ink. An out-of-phase digital watermark is embedded with signals of the first and second watermark signals. A digital camera or CCD sensor captures the visible color emissions (e.g., a visible image) after the first UV ink fluorescence emissions are exhausted (or fall below a predetermined level), but before the second UV ink fluorescence emissions are exhausted.

In another embodiment, a digital watermark signal is generated (or provided) and the signal is printed with ink having specific excitation and/or emission wavelength bands. Illumination and/or detection of the watermark are carried out in the specific bands. The digital watermark need not be out-of-phase as discussed herein. Instead, the watermark signal is detected by monitoring (or illuminating) the specific wavelength bands. The monitoring bands are preferably in either the infrared or ultraviolet regions of the spectrum.

Concluding Remarks

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patents, patent applications and magazine article are hereby incorporated by reference. The particular combinations of elements and features in the above-detailed embodiments are exemplary only; the interchanging and substitution of these teachings with other teachings in this application and the incorporated-by-reference patents/applications are expressly contemplated.

As mentioned above the use of the term "UV" is used to mean inks that absorb in the UV and emit in the UV and/or IR wavelengths. As discussed in the alternative embodiment section, there are also inks that absorb in the UV and emit visible wavelengths. Indeed the variable decay-time inks discussed herein can emit in a range from visible to UV wavelengths. Also, while "short decay" time inks and "long decay" time inks have been described as corresponding to "non-inverted" and "inverted" watermark signals, and to CMY channel signals and K channel signals, the invention is not so limited. Indeed a short decay ink can be used for an inverted signal and a K channel signal. And a long decay ink can be used for a non-inverted signal and a CMY channel signal. In addition to the ink application methods discussed above, inks and dyes can be application by well-known methods such as offset lithography, flexography, and silkscreen, as well as others. In some embodiments, these fluorescence varying inks and dyes can also vary in intensity. These characteristics can be evaluated for setting various threshold limits (e.g., T1 and T3 in FIG. 4).

Preferably, an out-of-phase watermark signal is embedded approximately 180 degrees out-of-phase with corresponding signal. However, some cancellation will still be achieved if the signal is approximately 180 degrees out-of-phase with a corresponding signal, for example, in a range of 0–20 degrees off of the 180-degree mark.

The term "decay" has a broad definition throughout this document including the claims. For instance, decay may imply that fluorescence emissions are extinguished. Or decay may imply that emissions have fallen below a threshold level (e.g., based on detection or interference levels). In some cases, decay implies that emissions have begun to decay, such as after a falling edge of a UV pulse. Similarly, for this document (including the attached claims) the term "ink" means ink and/or a dye.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general-computer, purpose computer, or on a server for distributed use. Data structures representing the various luminance values, summations, out-of-phase embedded signals, embedded color planes, color signals, data signals, luminance signals, etc., may also be stored on such computer readable media. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A printing method comprising the steps of:
   printing on a surface a first digital watermark component with a first ink having a first emission decay time; and
   printing on the surface a second digital watermark component with a second ink having a second emission decay time.

2. The method according to claim 1, wherein the first digital watermark component is out-of-phase with respect to the second digital watermark component.

3. The method according to claim 1 wherein the second digital watermark component is inverted with respect to the first digital watermark component, and wherein the first component and second component each include at least one attribute that is spatially registered on the surface.

4. The method according to claim 3 wherein the second emission decay time is longer than the first emission decay time.

5. The method according to claim 4, wherein the first ink and the second ink emit in the ultraviolet spectrum.

6. The method according to claim 4, wherein the first ink and the second ink emit in the infrared spectrum.

7. The method according to claim 4, wherein the first ink and the second ink emit visible light when excited with ultraviolet light.

8. The method according to claim 7, wherein the ultraviolet light comprises black ultraviolet light.

9. The method according to claim 4, further comprising the step of shielding the surface from visible light.

10. The method according to claim 4, further comprising the step of filtering visible light.

11. The method according to claim 4, wherein the first ink is printed with a first plate and the second ink is printed with a second plate.

12. The method according to claim 4, wherein the first ink prints the first digital watermark component in a cyan, magenta and yellow channel and the second ink prints the second digital watermark component in a black channel.

13. The method according to claim 4, wherein the first emission decay time and the second emission decay time each comprise at least one of emission exhaustion and emissions falling below a threshold level.

14. The method of claim 1, wherein the first digital watermark component is printed so as to cancel at least some of a change in luminance that is attributable to the second digital watermark component.

15. A method to detect a digital watermark embedded in media, the digital watermark comprising a first component printed with a first ink and a second component printed with a second ink, the second ink comprising an emission decay time that is longer than an emission decay time of the first ink, said method comprising the steps of:

exciting the first ink and the second ink; and detecting the digital watermark after emissions from the first ink fall to a first predetermined level and before emissions from the second ink fall to a second predetermined level.

16. The method according to claim 15, wherein the first component is inverted with respect to the second component, and wherein at least one part of the first component and one part of the second component are spatially aligned in the media.

17. The method according to claim 15, wherein the first ink and second ink each emit in the ultraviolet spectrum.

18. The method according to claim 15, wherein the first ink and second ink emit each in the infrared spectrum.

19. The method according to claim 15, wherein the first ink and the second ink each emit visible light when excited with ultraviolet light.

20. The method according to claim 15, wherein said detecting step comprises gating a camera to capture emissions from the second ink after emissions from the first ink fall to a first predetermined level and before emissions from the second ink fall to a second predetermined level.

21. The method according to claim 15, wherein said exciting step comprises pulsing an illumination source.

22. The method according to claim 21, further comprising a second step of exiting the first ink and the second ink after emissions from the first ink fall to the first predetermined level and before emissions from the second ink fall to the second predetermined level.

23. The method according to claim 22, wherein said second exciting step comprises pulsing the illumination source.

24. A document comprising a digital watermark embedded thereon, said digital watermark comprising:

a first component applied with a first ink comprising a first emission decay time; and a second component applied with a second ink comprising a second emission decay time.

25. The document according to claim 24, wherein the first component is inverted with respect to the second component, and wherein the first component and the second component are spatially registered with one another on the document.

26. The method according to claim 25, wherein the second emission decay time is longer than the first emission decay time.

27. The method according to claim 26, wherein the document comprises at least one of a certificate, paper, label, tag, product packaging, thin films, identification card, bank note, treasury bond, cardboard, metal foil, fabric, property title, plastic, metal insurance receipt, contract and trading card.

28. The method according to claim 26, wherein the first emission decay time and the second emission decay time comprise at least one of emission exhaustion and emissions falling below a threshold level.

29. The document according to claim 24, wherein the first component is applied on the document so as to counteract a luminance change tat is attributable to the second component at least while the document is under steady-state illumination.

30. A digital watermarking method comprising the steps of:

embedding a first digital watermark signal in at least a first color channel;

embedding a second digital watermark signal in at least a second color channel;

printing on a surface the embedded first color channel with a first ink comprising a first emission decay time; and printing on the surface the embedded second color channel with a second ink comprising a second emission decay time, wherein the second digital watermark signal is embedded in the second color channel so as to cancel at least some of a luminance change that is attributable to the first digital watermark signal at least while the printed surface is under steady-state illumination.

31. The method according to claim 30, wherein the first color channel comprises a cyan channel, a magenta channel and a yellow channel and the first ink comprises a cyan, magenta and yellow ink, and wherein the second color channel comprises a black channel and the second ink comprises a black ink.

32. The method according to claim 31, wherein the second decay time is longer than the first decay time.

33. The method according to claim 32, wherein the first decay time is longer than the second decay time.

34. The method of claim 30, wherein the second digital watermark signal is inverted with respect of the first digital watermark signal.

35. A digital watermarking method comprising the steps of:

embedding a first digital watermark component in a first color channel, wherein the first color channel is to be printed with a first ink having a first decay time embedding a second digital watermark component in a second color channel, wherein the second digital watermark component is embedded so as to be spatially registered with the first digital watermark component when printed to reduce a change in luminance that is attributable to the first digital watermark component.

36. The digital watermarking method of claim 35, further comprising:

printing the embedded first color channel with the first ink; and printing the embedded second color channel with a second ink having a second decay time, the first decay time being different than the second decay time.

37. A data hiding method comprising the steps of:

providing a first message component in a first color channel, wherein the first color channel is to be printed with a first ink comprising a first emission decay time;

providing a second message component in a second color channel, wherein the second message component is provided so as to be spatially registered with the first message component when printed to reduce visibility artifacts that are attributable to the first message component.

38. The data hiding method of claim 37, wherein the second message component is to be printed with a second ink having a second emission decay time, and wherein the second emission decay time is at least one of longer than the first emission decay time and shorter than the first emission decay time.

* * * * *

UNITED STATES PATENT AND TRADEMARK OFFICE
CERTIFICATE OF CORRECTION

PATENT NO. : 6,718,046 B2
DATED : April 6, 2004
INVENTOR(S) : Reed et al.

It is certified that error appears in the above-identified patent and that said Letters Patent is hereby corrected as shown below:

Title page,
Item [56], References Cited, OTHER PUBLICATIONS, change "U.S patent App. Ser. No. 09/433,104 Rhoads et all, filed Nov. 28, 2002," to -- U.S. patent App. Ser. No. 09/433,104 Rhoads et al., filed Nov. 3, 1999 --; and "Wang et al.", reference, change "Security and Watermaking of" to -- Security and Watermaking of --.
Item [63], Related U.S. Application Data, change "2000," to -- 2000 --. Delete the remainder of the paragraph starting on line 5, "which is a ..." through line 16,"...5,748,783."

Column 1,
Line 9, change "09/553,984," to -- 09/553,084 --.
Line 11, change "which is also cip" to -- is also related --.

Column 4,
Line 66, change "tat" to -- that --.

Column 8,
Line 18, change "to the go cancellation" to -- to the cancellation --.
Line 55, change "patent in applications" to -- patent applications --.
Line 64, change "Cans Ink" to -- Gans Ink --.

Column 9,
Line 64, change "0-20" to -- ±0-20 --.

Column 10,
Lines 12-13, change "general-computer, purpose computer," to -- general-purpose computer --.

Signed and Sealed this

Twenty-seventh Day of July, 2004

JON W. DUDAS
*Acting Director of the United States Patent and Trademark Office*